United States Patent [19]

Sannino

[11] Patent Number: 5,717,878
[45] Date of Patent: Feb. 10, 1998

[54] METHOD AND DEVICE FOR DISTRIBUTING MULTIMEDIA DATA, PROVIDING BOTH VIDEO BROADCAST AND VIDEO DISTRIBUTION SERVICES

[75] Inventor: Christian Sannino, Vieille Eglise, France

[73] Assignee: Sextant Avionique, Meudon La Foret, France

[21] Appl. No.: 386,542

[22] Filed: Feb. 10, 1995

[30] Foreign Application Priority Data

Feb. 25, 1994 [FR] France .................. 94 02311

[51] Int. Cl.$^6$ .............................. G06F 13/42; G06F 15/62
[52] U.S. Cl. ................... 395/327; 395/884; 395/858; 395/871; 395/200.09
[58] Field of Search .................. 395/200.09, 882, 395/884, 858, 871, 327

[56] References Cited

U.S. PATENT DOCUMENTS

| | | | |
|---|---|---|---|
| Re. 34,611 | 5/1994 | Fenwick et al. | 348/7 |
| 4,947,244 | 8/1990 | Fenwick et al. | 358/86 |
| 5,287,530 | 2/1994 | Davis et al. | 370/94.1 |
| 5,414,455 | 5/1995 | Hooper et al. | 348/7 |
| 5,442,749 | 8/1995 | Northcutt et al. | 395/200.09 |
| 5,508,732 | 4/1996 | Bottomley et al. | 348/7 |
| 5,519,707 | 5/1996 | Subramanian et al. | 370/94.2 |

FOREIGN PATENT DOCUMENTS

| | | |
|---|---|---|
| 0277014 | 8/1988 | European Pat. Off. |
| 0355697 | 2/1990 | European Pat. Off. |
| 0579980 | 1/1994 | European Pat. Off. |

OTHER PUBLICATIONS

"Satellite Communication Systems for Multimedia Serivces," Araki et al, IEEE, 1993, pp. 690–695.
"Design of a Multicast ATM Packet Switch", Fliesser et al, IEEE, 1993, pp. 779–783.
"Hierarchical Distribution of Video with Dynamic Port Allocation", Yum, IEEE, 1991, pp. 1268–1274.

Primary Examiner—Christopher B. Shin
Assistant Examiner—Rehana Perveen
Attorney, Agent, or Firm—Browdy and Neimark

[57] ABSTRACT

The method embodying the invention uses a data transmission network between at least a server connected to data sources and a plurality of receiving and dialog peripherals for users. This network transmits the data in the form of a succession of digital data cells respectively associated with a virtual channel constituting a source/destination link for the data. In a first mode, each channel is associated with a respective previously compiled program whereas, in a second mode, a virtual channel is associated with each user, the latter being able to individually access and act on the different sources in order to compose the program he wishes to view. The invention applies notably to the distribution of data on board an aircraft.

12 Claims, 2 Drawing Sheets

METHOD AND DEVICE FOR DISTRIBUTING MULTIMEDIA DATA, PROVIDING BOTH VIDEO BROADCAST AND VIDEO DISTRIBUTION SERVICES

BACKGROUND OF THE INVENTION

FIELD OF THE INVENTION

This invention relates to a method and a device for the distribution of "multimedia" data, notably on board a vehicle such as e.g. an aircraft.

OBJECT OF THE INVENTION

More particularly, the object of this invention is to provide a distribution system enabling at least two types of services to be obtained, i.e.

- a "video broadcasting" service enabling users who have an appropriate peripheral to select the video program they wish to view, from among a given number of programs proposed,
- a "video distribution" service enabling users to compose their own video program, by setting up a "virtual channel" between their peripheral and a video server.

The object of the invention is more particularly to achieve these ends by means of a system with the following features, among others:

utilisation of an entirely digital technology, modularity enabling several different performance configurations to be obtained with a same equipment basis, transparency with regard to video image storage and generation technologies, ability to perform and host new services, possibility of link-up with the other data management systems in the aircraft (electronic library, flight management system).

SUMMARY OF THE INVENTION

Accordingly, with a view to achieving these results, there is provided a method using a network distributing data between a video server (capable of supplying a multiplicity of previously compiled programs) and a plurality of receiving and dialog peripherals for the use of users. This network is based on the transmission of blocks or "cells" of digital data, e.g. according to the ATM ("Asynchronous Transfer Mode) model, and the association of each cell with a virtual link or "virtual channel" between the source and destination of the data.

When the service the user wishes to obtain is of the "video broadcasting" type, the method embodying the invention comprises the transmission, to all the peripherals, of all the virtual channels, with the user then indicating which virtual channel corresponds to the previously compiled program he wishes to obtain.

When the service is of the "video distribution" type, the method embodying the invention consists in associating with each user a virtual channel by means of which he can individually access and act on the different sources so as to compose the program he wishes to view.

An important advantage of the method described above is the fact that a same system can ensure a combination of services of the "video broadcasting" and "video distribution" types, by way of the use of virtual channels and the ATM technique, the sole limitation being the technological limitation of the video storage medium.

The device for implementing the method described above can use, in its simplest configuration, a video server that manages the access to storage media or, more generally, to data sources, that carries out the editing into cells of the video data flows, that receives the orders allocating the virtual channels, that assigns the cells to a virtual channel and that multiplexes the virtual channels towards a network head end designed so as to receive the virtual channels transporting the video data, to construct the flow of data to be transmitted towards distribution cases, to perform the routing of the virtual channels in the event of there being several network head ends, to ensure the management and allocation of the virtual channels, and possibly to reconfigure the topology of the overall network to change to the degraded mode.

The distribution case is designed to receive the virtual channel selection orders coming from the peripherals to which it is linked, as well as the flow of video data coming from the head end of the network. It comprises a means enabling the extraction or copying of the cells assigned to a virtual channel belonging to it, and the orienting of the flow of data in the virtual channel to the destination peripheral. Furthermore, it is designed to transmit the orders input by the user to the head end of the network to which it is linked. The receiving and dialog peripherals comprise a viewing and dialog means that can be of a conventional type.

BRIEF DESCRIPTION OF THE DRAWINGS

Further features and advantages of the invention will be apparent from the embodiments of the invention described, by way of non-limiting examples, in reference to the corresponding accompanying drawings in which.

DESCRIPTION OF THE PREFERRED EMBODIMENTS

Figure 1:
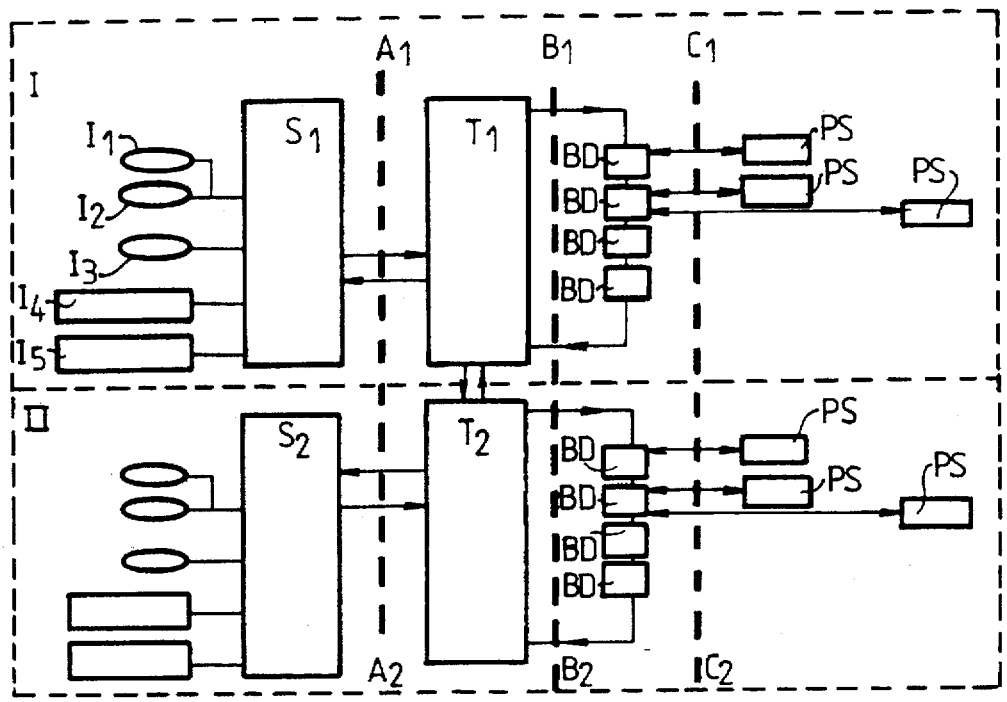
FIG. 1 is a schematic representation of the hardware architecture of a device for the distribution of data on board a vehicle such as e.g. an aircraft.

In the example represented in FIG. 1, the system comprises two devices of identical structure (blocks I, II in broken lines) each comprising a video server $S_1$, $S_2$ connected with a plurality of data carriers $I_1$ to $I_5$, such as CDROM type memories $I_1$, $I_2$, hard disks $I_3$ and data sources $I_4$ (satellite broadcasting, HF or VHF "DATALINK", ... or even to the other aircraft systems $I_5$ such as ELS, FMS, CCS).

This video server $S_1$, $S_2$ is connected, via a first interface $A_1$, $A_2$ to a head end $T_1$, $T_2$ to which a plurality of serially mounted distribution cases BD are connected via a second interface $B_1$, $B_2$.

Each of these distribution cases BD is connected, via a third interface $C_1$, $C_2$ to at least one peripheral PS, e.g. a peripheral associated with each seat in the aerodyne, this peripheral comprising a viewing screen associated with a dialog means such as a keyboard, touch-sensitive surface, etc.

In a general manner, the video server $S_1$, $S_2$ manages the accesses to the media or carriers and to the data sources $I_1$ to $I_5$. It receives the flow of compressed video data coming from these sources and media $I_1$ to $I_5$ and edits these data into cell form.

As mentioned above, each cell is associated with a virtual link between the data source and the destination. This link could e.g. be the connection mode link of the "OPEN SYSTEM INTERCONNECTION" reference model defined by the ISO standard ISO 7498. In the description of the ATM (Asynchronous Transfer Mode) model, this link is referred to as "virtual channel".

The images are transmitted compressed, e.g. in accordance with MPEG coding (ISO 11172).

Moreover, the video server $S_1$, $S_2$ receives virtual channel allocation orders from the peripherals PS and assigns the cells to a virtual channel in accordance with these orders. It also has the task of multiplexing the virtual channels towards the first interface $A_1$, $A_2$.

The latter defines the format and protocol of the data traveling between the video server $S_1$, $S_2$ and the head end $T_1$, $T_2$. Typically, this interface $A_1$ can consist of a high-thruput link with e.g. a capacity of the order of fifty virtual video channels (100 Mb/s class).

The head end $T_1$, $T_2$ receives the virtual channels transporting the video data coming from the video server $S_1$, $S_2$. The head end builds the flow of data directed towards the second interface $B_1$, $B_2$, performs the routing of the virtual channels when there are several head ends $T_1$, $T_2$, and ensures the management and allocation of the virtual channels. It can also be designed to reconfigure the topology of the overall network to change over to the degraded mode.

The interface $B_1$, $B_2$ defines the format and protocol of the data traveling between the head end $T_1$, $T_2$ and the distribution cases BD. As with the interface $A_1$, $A_2$, this is a high-thruput link with a capacity of the order of fifty virtual video channels (100 Mb/s class).

This interface $B_1$, $B_2$ is a one-way interface, the transmission of data from the peripheral to the head end $T_1$, $T_2$ or video server $S_1$, $S_2$ is ensured by the ring network constituted by the interconnection of the distribution cases BD and the head end $T_1$, $T_2$.

The interface $B_1$, $B_2$ also connects the network head ends $T_1$, $T_2$ to one another.

For the purposes of homogeneity, the interfaces $A_1$, $A_2$ and $B_1$, $B_2$ have a same protocol. However, they may differ from one another by the thruput of the physical links.

The distribution case BD receives the orders, transmitted by the peripheral PS, for selection of a virtual channel, in addition to the flow of video data coming from the interface $B_1$, $B_2$. It extracts or copies the cells assigned to a virtual channel belonging to it and directs the data flow from the virtual channel to the destination peripheral PS, via the interface $C_1$, $C_2$. It formats the data flow from the interface $B_1$, $B_2$ to the interface $C_1$, $C_2$ and transmits the user orders sent out from the interface $C_1$, $C_2$ to the head end $T_1$, $T_2$ to which it is connected, via the interface $B_1$, $B_2$.

The third interface $C_1$, $C_2$ defines the format and protocol of the data traveling between the distribution case and a peripheral of the seat.

This can be a low-thruput link required for the transmission of a single virtual channel (2 Mb/s class). This interface is a two-way interface.

Figure 2:
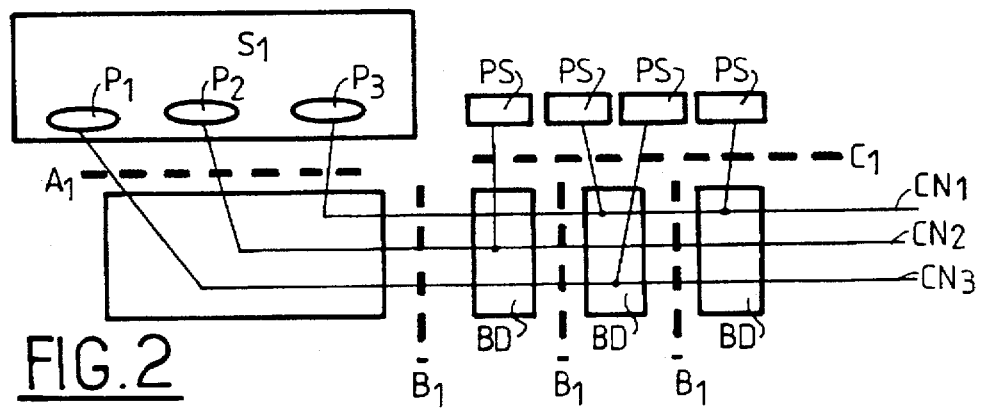
FIGS. 2 and 3 are schematic representations for the purposes of illustrating the working principle of the device represented in FIG. 1 in the broadcasting mode (FIG. 2) and in the distribution mode (FIG. 3)
Figure 3:
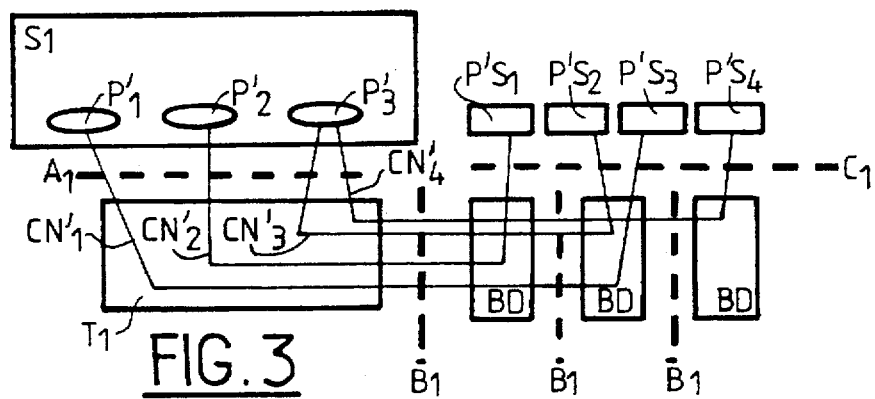

The operating of the device previously described is illustrated in FIGS. 2 and 3.

In the "broadcasting" mode, each video program is associated with a channel. All the peripherals PS are destinations of all the virtual channels. It is up to the user of a peripheral PS to indicate the channel, and consequently the video program he wishes to view (like a conventional television set).

In FIG. 2, the server proposes three programs $P_1$, $P_2$, $P_3$ accessible by each of the peripherals, via the distribution cases, by means of three virtual channels $CN_1$, $CN_2$, $CN_3$. The invention is obviously not limited to such a number of channels. Thus, the capacity of the interface can be N channels, where N is the number of video programs, N generally being limited to some twenty programs simultaneously. A single head end $T_1$, $T_2$ can then perform the broadcasting function.

In the "distribution" mode, each user is associated with a personalized virtual channel set up by the user at the time of composing his own video program, which can use the available sources $P_1$ to $P_5$, between his peripheral PS and a video server $S_1$. The time sequence of each personalized program is independent for each user (Video on Demand). The number of virtual channels simultaneously open on a server is limited by the technology of this server and the number of virtual channels supported by the interfaces $A_1$, $A_2$ and $B_1$, $B_2$.

In FIG. 3, the four virtual channels $CN'_1$ to $CN'_4$ represented respectively and individually connect the peripherals P'S $_1$ and P'S $_3$ to the sources $P'_2$ and $P'_1$ of the server and the peripherals P'S $_2$ and P'S $_4$ to the source $P'_3$ of this same server $S_1$.

More generally, the interface $B_1$, $B_2$ can of course be occupied by M virtual channels, where M represents the number of programs distributed individually to the users.

This number M may exceed the physical capacity of the interface $B_1$, $B_2$.

In this case, several head ends will be required as indicated in FIG. 1.

Figure 4:
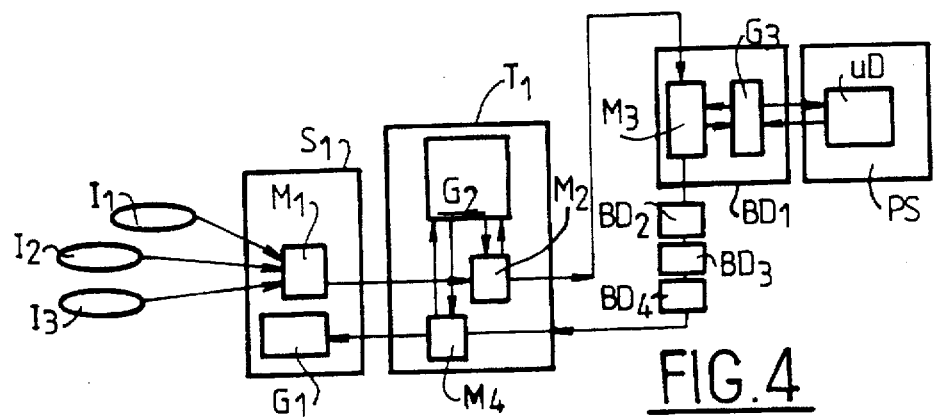
FIG. 4 shows further details of the architecture of a device (single head end and single-server) configured in the broadcasting mode.

In the "broadcasting" configuration, the video server $S_1$ can comprise, as represented in FIG. 4, an insertion multiplexer $M_1$ (extraction of "cells") as well as a management unit $G_1$ for the video server $S_1$.

The multiplexer $M_1$ is connected by its inputs to the different data sources (of which only three $I_1$ to $I_3$ are represented).

It is connected by its output to a multiplexer M2 of the same type that is part of the head end. This multiplexer $M_2$ is coupled, by a two-way link, with a management unit $G_2$ of the head end $T_1$, The output of the multiplexer $M_2$ is connected to the input of a multiplexer $M_3$ that is part of a first distribution case $BD_1$ of a loop of distribution cases $BD_1$ to $BD_4$, each having an identical structure.

This multiplexer $M_3$ is further connected, on the one hand, by a two-way link to a management unit $G_3$, itself connected by a two-way link to a video decompression unit UD of a seat peripheral PS associated with the distribution case BD, and, on the other hand, by a one-way link to the multiplexer of the next distribution case BD.

The connections between the other successive distribution cases $BD_2$ to $BD_4$ in the chain are made in the same way, by means of one-way links.

The multiplexer of the last distribution case $BD_4$ is connected by a one-way link to a multiplexer $M_4$ of the head end $T_1$ which is coupled to the management unit $G_2$ by a two-way link. The output of this multiplexer $M_4$ is connected to the management unit $G_1$ of the video server $S_1$.

Figure 5:
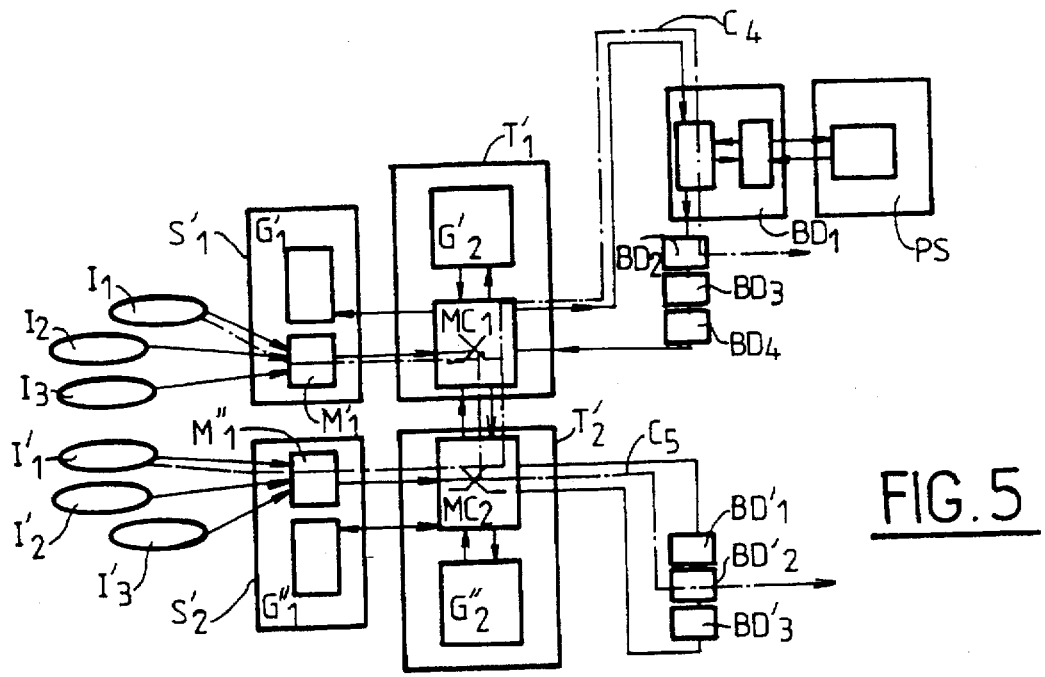
FIG. 5 shows further details of the architecture of a device according to FIG. 1, configured in the distribution mode.

In the video distribution configuration, the device can have a structure of the type of the device represented in FIG. 5 comprising several sets each including a video server $S'_1$, $S'_2$, a network head end $T'_1$, $T'_2$ and a loop of distribution cases $BD_1$ to $BD_4$–$BD'_1$ to $BD'_4$ in which each case is associated with at least one peripheral PS.

In this example, each video server $S_{,1}$, $S_{,2}$ comprises, as previously, an insertion multiplexer $M'_1$, $M''_1$ (extraction of cells) connected to the different data sources $I_1$ to $I_3$–$I'_1$ to $I'_3$ and to a video server management unit $G'_1$, $G''_1$.

The head ends $T_1$, $T_2$ each comprise a cell switching matrix $MC_1$, $MC_2$ driven by a management unit $G'_2$, $G''_2$ via a two-way link. This matrix $MC_1$, $MC_2$ is more particularly designed so as to:

receive the data transmitted by the multiplexer $M'_1$, $M''_1$ as well as the data coming from the chain of distribution cases $BD_1$ to $BD_4$, $BD'_1$ to $BD'_3$, transmit the data coming from the distribution case chains $BD_1$ to $BD_4$ to the management unit $G'_1$, $G''_1$ of the video server $S'_1$, $S'_2$ associated with it, and to its own management unit $G'_2$, $G''_2$, exchange data (by way of a two-way link) with the switching matrix of a head end $T'_1$, $T'_2$ of another set.

The switching matrices $MC_1$, $MC_2$ are controlled by the management unit $G'_2$, $G''_2$ associated with them, as a function of data received by the latter.

In this FIG., two virtual channels, represented by links $C_4$ and $C_5$, set up communication between a data source of one of the sets and a peripheral belonging to the other set.

Figure 6:
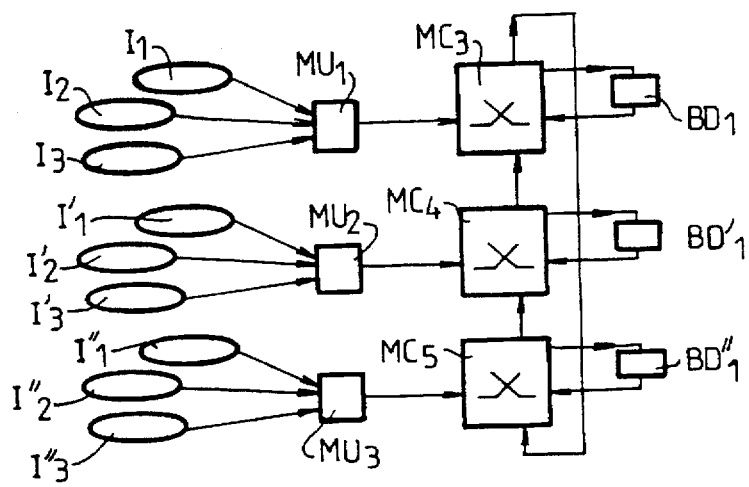
FIG. 6 is a diagram of a device with three head ends and three servers configured in the distribution mode.

FIG. 6 shows an embodiment of a network comprised of three sets each comprising a video server (of which only the multiplexer $MU_1$ to $MU_3$ has been represented) coupled to a plurality of data sources $I_1$ to $I_3$, $I'_1$ to $I'_3$, $I''_1$ to $I''_3$, a head end (of which only the switching matrix $MC_3$, $MC_4$, $MC_5$ has been represented), and a loop of distribution cases $BD_1$, $BD'_1$, $BD''_1$, (of which only one has been represented for the purposes of simplification).

In this case, the cell switching matrices $MC_3$, $MC_4$, $MC_5$ are not connected to one another by two-way links but by one-way links arranged in such a way as to constitute a loop of matrices.

As previously mentioned, the basic application of the system previously described is the distribution of video programs on board a vehicle such as an aerodyne. However, the invention is not limited to this type of application. In fact, this system further enables interactive dialogs to be set up between the user of a peripheral and a multiplicity of data sources which may be managed by processors.

In fact, the digital structure of the data distributed authorizes all types of extensions of the system to exchanges other than video, such as e.g. the transfer of computer files, the transmission of fax messages, the transmission of various data that may pertain to the flight of the aerodyne, weather, or even messages intended for the passengers.

Furthermore, the modularity of the system makes it possible to envisage configurations providing, as a function of a criterion such as traveling class, a broadcasting mode or a distribution mode.

This is notably made possible by the fact that, seen from the distribution network (i.e. interfaces A and B), there is no difference between the virtual channels associated with a program and those associated with a user.

By way of these arrangements, this system is highly flexible and has considerable upgrading potential, criteria that are much sought after by customers of these systems, e.g. the airline companies.

In particular, the complexity of the configurations made possible by these systems can be increased, according to the availability of the techniques used, by virtue of the functional breakdown proposed (server/network head end/ distribution case), and of the standardization of the interfaces.

I claim:

1. A method for distributing program data provided by a plurality of program sources, to a multiplicity of users, said method using a data transmission network between at least one server connected to said sources and a plurality of receiving and dialog user terminal, said program data being transmitted by said network in the form of a succession of time-multiplexed digital data blocks or cells each being associated with a virtual channel number, said method comprising:

a first mode enabling each of said users to select a broadcasting program from among a predetermined number of programs proposed by said sources, and comprising the steps of:

(i) allocating a respective virtual channel number to each of said sources, and (ii) transmitting to each user terminal the program data from said sources in cells associated with the virtual channel number allocated respectively to said sources, (iii) selecting by each of said user terminals the cells associated to a virtual channel number allocated to a source selected by a user on said terminal, a second mode enabling each of said users to access and act on said sources in order to compose a program, and comprising the steps of:

(i) allocating a respective virtual channel number to each of said user terminals, (ii) transmitting to each of said sources program commands introduced by the users in each of said terminals in the form of data cells associated to the respective virtual channel number allocated to said terminal, (iii) transmitting to said terminals from said sources in response to said program commands program data in the form of data cells associated to the virtual channel numbers respectively associated to the data cells in which said program commands were transmitted.

2. A network for distributing program data provided by a plurality of program data sources, to a multiplicity of users, according to a first mode enabling each user to select a broadcasting program from among a predetermined number of programs proposed by said sources, and a second mode enabling said user to access and act on said sources in order to compose a program, said network linking said sources with a plurality of receiving and dialog user terminals each comprising a viewing and dialog means, said network comprising:

at least one server connected to said sources and comprising means for managing accesses to said sources, means for editing program data flows from said sources into time-multiplexed data cells assigned respectively to virtual channels linking respectively said sources to each user terminal in a first mode and linking respectively said user terminals to each source in a second mode, means for collecting said cells associated to each of said virtual channels, and means for multiplexing said virtual channels towards said user terminals, at least one head end connected to said server and comprising means for receiving program data from said virtual channels, means for constructing from the data cells transmitted by said virtual channels a flow of data cells to be transmitted towards said user terminals, and means for routing said virtual channels in the event of there being several network head ends, and distribution cases interconnected by a ring network and linking said head end respectively to groups of at least one of said user terminals, each distribution case comprising means for receiving virtual channel selection orders coming from the user terminals linked to said case, as well as the flow of data cells coming from said head end, means for extracting or copying the cells assigned to virtual channels allocated in said second mode to said user terminals and selected in said first mode by the user terminals linked to said case, means for routing said flow of data in said virtual channels to the user terminals linked to said case, and means for transmitting to said head end program orders introduced by users in the user terminals linked to said case.

3. The method as claimed in claim 1, wherein said transmission of digital data cells is performed according to the ATM model.

4. The method according to claim 1, said method comprising combining said first and second modes in said network.

5. The network as claimed in claim 2, wherein said flow of data from the sources is compressed.

6. The network as claimed in claim 2, further comprising a first interface between said video server and said head end, defining a format and protocol of the data traveling between said server and said head end.

7. The network as claimed in claim 2, further comprising, between said head end and said distribution cases, a second interface which defines format and protocol of the data traveling between said head end and said distribution cases.

8. The network as claimed in claim 7, wherein said second interface also connects a plurality of network head ends to one another.

9. The network as claimed in claim 7, wherein said first and second interfaces have a same protocol.

10. The network as claimed in claim 2, wherein each of said network head ends comprises a multiplexer driven by a management unit.

11. The network as claimed in claim 2, further comprising two network head ends each comprising a switching matrix driven by a management unit, said two switching matrices exchanging data by means of a two-way link.

12. The network as claimed in claim 2, further comprising at least three network head ends each comprising a switching matrix driven by a management unit, said three switching matrices being interconnected by one-way links in such a way as to constitute a loop.

* * * * *